US007644364B2

(12) United States Patent
Patten et al.

(10) Patent No.: US 7,644,364 B2
(45) Date of Patent: Jan. 5, 2010

(54) PHOTO AND VIDEO COLLAGE EFFECTS

(75) Inventors: Michael J. Patten, Sammamish, WA (US); Michael F. Matsel, Seattle, WA (US); Russell Scott Randall, Seattle, WA (US); Warren L. Burch, Redmond, WA (US); Ian Mercer, Sammamish, WA (US); Randolph Bruce Oakley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 470 days.

(21) Appl. No.: 11/250,738

(22) Filed: Oct. 14, 2005

(65) Prior Publication Data

US 2007/0089152 A1    Apr. 19, 2007

(51) Int. Cl.
*G06F 3/00* (2006.01)
(52) U.S. Cl. ........................ 715/726; 715/723; 715/835; 715/837
(58) Field of Classification Search ......... 715/719–726, 715/835–838, 826, 788, 867
See application file for complete search history.

(56) References Cited

U.S. PATENT DOCUMENTS

| | | | | |
|---|---|---|---|---|
| 5,148,154 | A * | 9/1992 | MacKay et al. | 715/782 |
| 5,369,735 | A | 11/1994 | Thier et al. | |
| 5,513,306 | A * | 4/1996 | Mills et al. | 715/202 |
| 5,617,539 | A * | 4/1997 | Ludwig et al. | 709/205 |
| 5,706,417 | A * | 1/1998 | Adelson | 345/640 |
| 5,926,603 | A * | 7/1999 | Tanaka et al. | 386/53 |
| 5,929,867 | A * | 7/1999 | Herbstman et al. | 345/474 |
| 5,999,173 | A * | 12/1999 | Ubillos | 715/724 |
| 6,028,603 | A * | 2/2000 | Wang et al. | 715/776 |
| 6,097,389 | A * | 8/2000 | Morris et al. | 715/804 |
| 6,188,831 | B1 | 2/2001 | Ichimura | |
| 6,204,840 | B1 * | 3/2001 | Petelycky et al. | 715/202 |
| 6,351,765 | B1 * | 2/2002 | Pietropaolo et al. | 709/218 |
| 6,400,996 | B1 | 6/2002 | Hoffberg et al. | |
| 6,404,978 | B1 * | 6/2002 | Abe | 386/55 |

(Continued)

FOREIGN PATENT DOCUMENTS

JP        05290548 A    11/1993

(Continued)

OTHER PUBLICATIONS

Wikipedia, "Windows Movie Maker", http://en.wikipedia.org/wiki/Windows_Movie_Maker, saved printout pp. 1-18 on Feb. 28, 2008.*

(Continued)

*Primary Examiner*—Weilun Lo
*Assistant Examiner*—William Wong
(74) *Attorney, Agent, or Firm*—Senniger Powers LLP

(57) ABSTRACT

A media editing application for creating and displaying video effect clips. A detection component detects video files stored in a memory of a computer. A user interface displays the detected video files and various video effects that can be applied to video files. The user interface is responsive to a user selecting one or more of the detected video files to apply a selected video effect to the selected video files to create the video effect clip. The user interface is further responsive to user input to display the video effect clip.

16 Claims, 12 Drawing Sheets

U.S. PATENT DOCUMENTS

| | | | |
|---|---|---|---|
| 6,430,355 B1 * | 8/2002 | Nagasawa | 386/52 |
| 6,469,723 B1 * | 10/2002 | Gould et al. | 715/837 |
| 6,476,826 B1 | 11/2002 | Plotkin et al. | |
| 6,546,188 B1 * | 4/2003 | Ishii et al. | 386/52 |
| 6,546,397 B1 * | 4/2003 | Rempell | 707/102 |
| 6,628,303 B1 * | 9/2003 | Foreman et al. | 715/723 |
| 6,714,216 B2 * | 3/2004 | Abe | 715/723 |
| 6,721,361 B1 | 4/2004 | Covell et al. | |
| 6,928,613 B1 * | 8/2005 | Ishii et al. | 715/726 |
| 7,042,464 B1 | 5/2006 | Paquette | |
| 7,117,453 B2 * | 10/2006 | Drucker et al. | 715/833 |
| 7,124,366 B2 | 10/2006 | Foreman et al. | |
| 7,149,974 B2 * | 12/2006 | Girgensohn et al. | 715/723 |
| 7,203,380 B2 * | 4/2007 | Chiu et al. | 382/284 |
| 7,222,300 B2 * | 5/2007 | Toyama et al. | 715/723 |
| 7,398,004 B1 * | 7/2008 | Maffezzoni et al. | 386/55 |
| 2001/0035875 A1 | 11/2001 | Suzuki et al. | |
| 2001/0040592 A1 | 11/2001 | Foreman et al. | |
| 2001/0041020 A1 | 11/2001 | Shaffer et al. | |
| 2002/0041707 A1 * | 4/2002 | Newman | 382/167 |
| 2002/0056095 A1 * | 5/2002 | Uehara et al. | 725/38 |
| 2002/0118302 A1 * | 8/2002 | Iizuka et al. | 348/578 |
| 2002/0122067 A1 * | 9/2002 | Geigel et al. | 345/788 |
| 2002/0138619 A1 | 9/2002 | Ramaley et al. | |
| 2002/0167541 A1 * | 11/2002 | Ando et al. | 345/723 |
| 2002/0178450 A1 * | 11/2002 | Morita et al. | 725/61 |
| 2003/0002851 A1 * | 1/2003 | Hsiao et al. | 386/52 |
| 2003/0032033 A1 | 2/2003 | Anglin et al. | |
| 2003/0063125 A1 * | 4/2003 | Miyajima et al. | 345/781 |
| 2003/0086686 A1 * | 5/2003 | Matsui et al. | 386/52 |
| 2003/0103074 A1 * | 6/2003 | Jasinschi | 345/716 |
| 2003/0146915 A1 * | 8/2003 | Brook et al. | 345/473 |
| 2003/0190143 A1 * | 10/2003 | Girgensohn et al. | 386/55 |
| 2003/0192049 A1 * | 10/2003 | Schneider et al. | 725/51 |
| 2003/0227493 A1 * | 12/2003 | Yokomizo | 345/867 |
| 2003/0237091 A1 | 12/2003 | Toyama et al. | |
| 2004/0001079 A1 * | 1/2004 | Zhao et al. | 345/719 |
| 2004/0004626 A1 * | 1/2004 | Ida et al. | 345/626 |
| 2004/0049419 A1 * | 3/2004 | Knight | 705/14 |
| 2004/0131340 A1 * | 7/2004 | Antoun et al. | 386/125 |
| 2005/0033758 A1 | 2/2005 | Baxter | |
| 2005/0071774 A1 * | 3/2005 | Lipsky et al. | 715/788 |
| 2005/0081159 A1 | 4/2005 | Gupta et al. | |
| 2005/0114357 A1 | 5/2005 | Chengalvarayan et al. | |
| 2005/0216454 A1 | 9/2005 | Diab et al. | |
| 2006/0059426 A1 * | 3/2006 | Ogikubo | 715/723 |
| 2006/0288288 A1 | 12/2006 | Girgensohn et al. | |
| 2007/0074115 A1 * | 3/2007 | Patten et al. | 715/716 |
| 2007/0218448 A1 | 9/2007 | Harmeyer et al. | |
| 2008/0034325 A1 * | 2/2008 | Ording | 715/838 |

FOREIGN PATENT DOCUMENTS

| | | |
|---|---|---|
| WO | 0115169 A1 | 3/2001 |
| WO | 0179964 A2 | 10/2001 |

OTHER PUBLICATIONS

Microsoft, "Adding Video Effects to Your Movies with Windows Movie Maker 2", Nov. 13, 2003, http://www.microsoft.com/windowsxp/using/moviemaker/learnmore/addingeffects.mspx, printout pp. 1-3.*

Author Unknown, PowerPoint 3D transition and Sound Effects! PowerPlugs: Transitions. CrystalGraphics. Internet Archive WayBackMachine, http://web.archive.org/web/20040202001801/http://www.crystalgraphics.com/presentations/transitions.main.asp, accessed Mar. 26, 2007 (archive dated Feb. 2, 2004), 16 pages.

Unknown, "Heroglylph V2 (Software Demo)," available at http://www.filecart.com/details/12782/441/Heroglyph.php, Oct. 10, 2004, 3 pages.

* cited by examiner

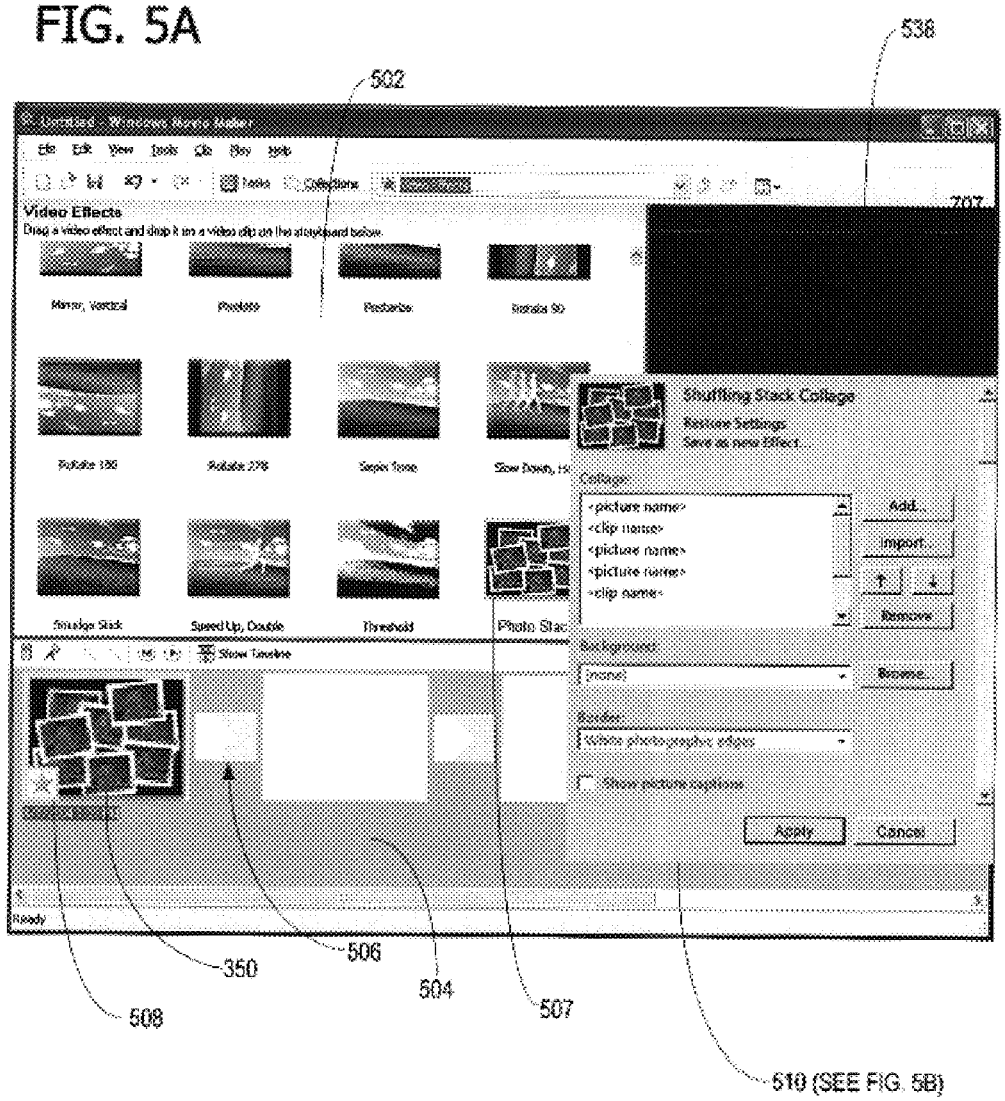

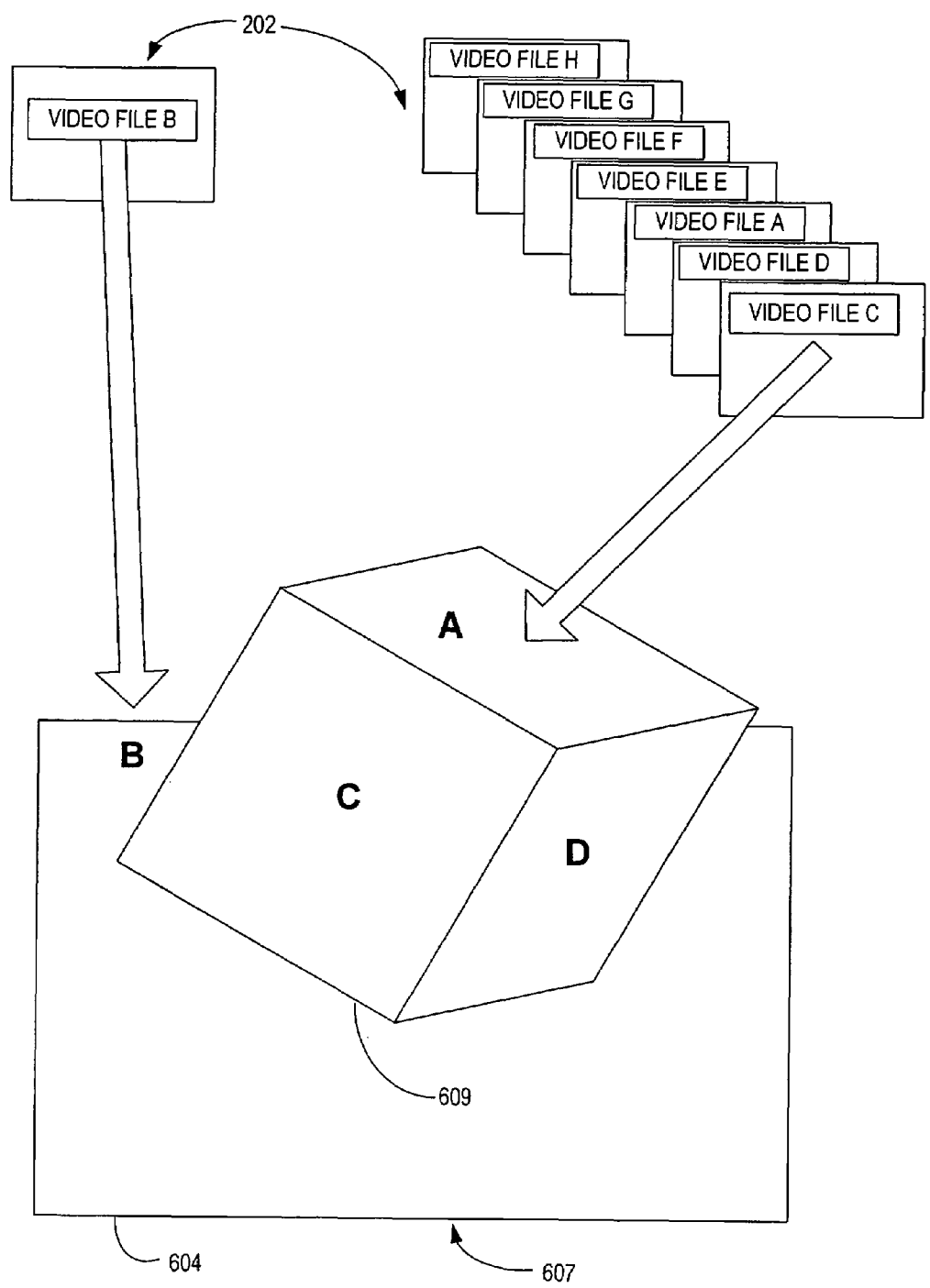

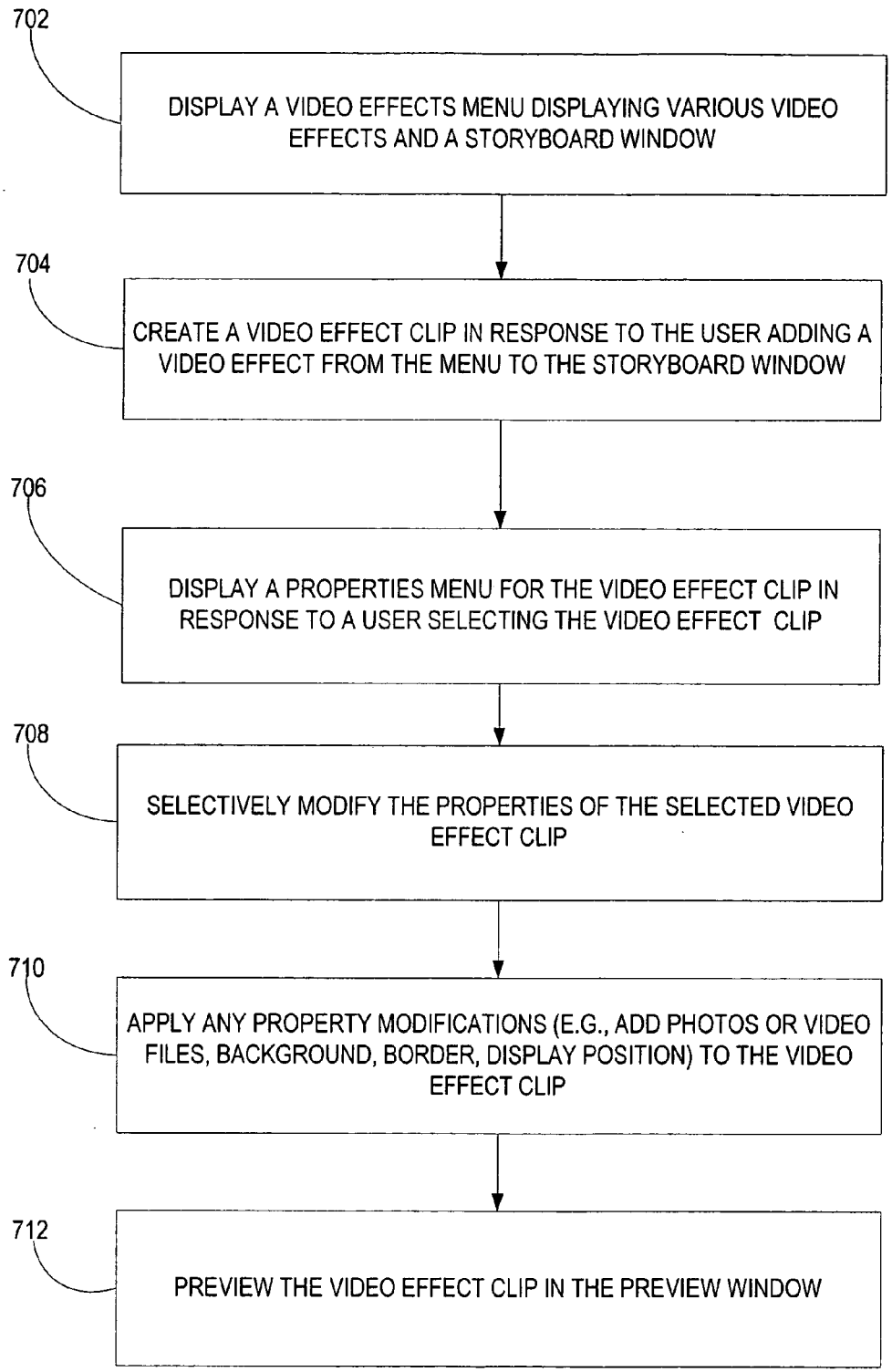

PHOTO AND VIDEO COLLAGE EFFECTS

BACKGROUND

An increasing number of people use cameras to take photographs and/or camcorders to make videos to capture their experiences and document events in their lives. Known video playback, browsing and editing applications, such as multivideo editing applications (MEAs), allow a user to bring versatility to such video recordings and photographs via a personal computer by allowing the user to capture or transfer the video or photograph onto the computer as a video file and to manually segment the digital video file into a recording or clip that displays events of the user's choosing. Some MEAs make this easier for the user by attempting to automatically detect shot boundaries within a particular video file. Thereafter, the MEA may segment the video file into shots that are displayed in a library or menu to allow the user to manually select shots and combine them to form a desired recording. The MEA may also allow the user to add animation or special effects (video effects) to selected shots or clips included in the recording. For example, the user may want to include a photo or video collage effect in the recording to display multiple photos and/or video clips on the display at a given time.

Conventional MEAs use video tracks to enable the user to create such video effects. For example, a conventional MEA allows the user to create a photo or video collage effect by adding one or more video clips on a timeline that corresponds to a specific period of time, and by manually adjusting the size and locations of each video clips on the timeline. For example, FIG. 1 shows five video tracks 102, 104, 106, 108, and 110 used to create a photo collage for ten photos, labeled A-J. In this example, the photos are added to the video tracks by a user (e.g., via a drag-and-drop operation) and are staggered with respect to a timeline 112 such that only one or two of the photos are displayed at any given time. As can be seen, photo A is positioned on video track 102 and photo B is positioned on video track 104 such that photo A is displayed first and photo B is displayed next. After photo B is displayed, photo C, which is positioned on video track 106, is displayed. This pattern continues for the remaining photos. Thus, by staggering photos on the timeline 112 and adjusting the size and location of the photos, multiple photos can be shown at the same time to create a photo collage effect. This same technique can also be applied to video files and video clips. That is, by staggering video clips on the timeline 112 and adjusting the size and location of the video clips, multiple video clips can be shown at the same time to create video collage effect. Nevertheless, this technique is tedious and difficult for most users to master. For example, in order to display five photos on the screen at a given time, the user is required to add the five video tracks, add a resize effect to each video clip, add fade-in and fade-out effects, add key frames to each video to determine positioning and motion, stagger photos on timeline to create collage effect, and manually adjust the duration of each photo and video clip. Moreover, adding additional photos, rearranging photos, changing photo durations, determining each photos position is extremely task intensive. For example, to adjust the duration of each photo from five (5) seconds to seven (7) seconds would require the user to manually adjust the duration and location of each photo on the time. To create a three photo animated collage would require the user to rearranging the photos on the timeline so that three photos are aligned vertically at given points on the timeline.

SUMMARY

Aspects of the invention not only add video effects to video clips included in a recording, but provide a video effects tool that enables the user to select a video effect to apply to videos clips and/or photos to create a video effect clip. Accordingly, users can create complicated video effects quickly and easily.

Computer-readable media having computer-executable instructions for segmenting videos embody further aspects of the invention. Alternatively, embodiments of the invention may comprise various other methods and apparatuses.

Other features will be in part apparent and in part pointed out hereinafter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIGS. 5A and 5C illustrate an exemplary graphical user interface for creating a video effect clip according to one aspect of the invention.

FIGS. 6A, 6B, and 6C illustrate various video effects.

FIG. 7 is an exemplary flow chart illustrating a method for creating a video effect clip according to one aspect of the invention.

Corresponding reference characters indicate corresponding parts throughout the drawings.

DETAILED DESCRIPTION

Figure 2:
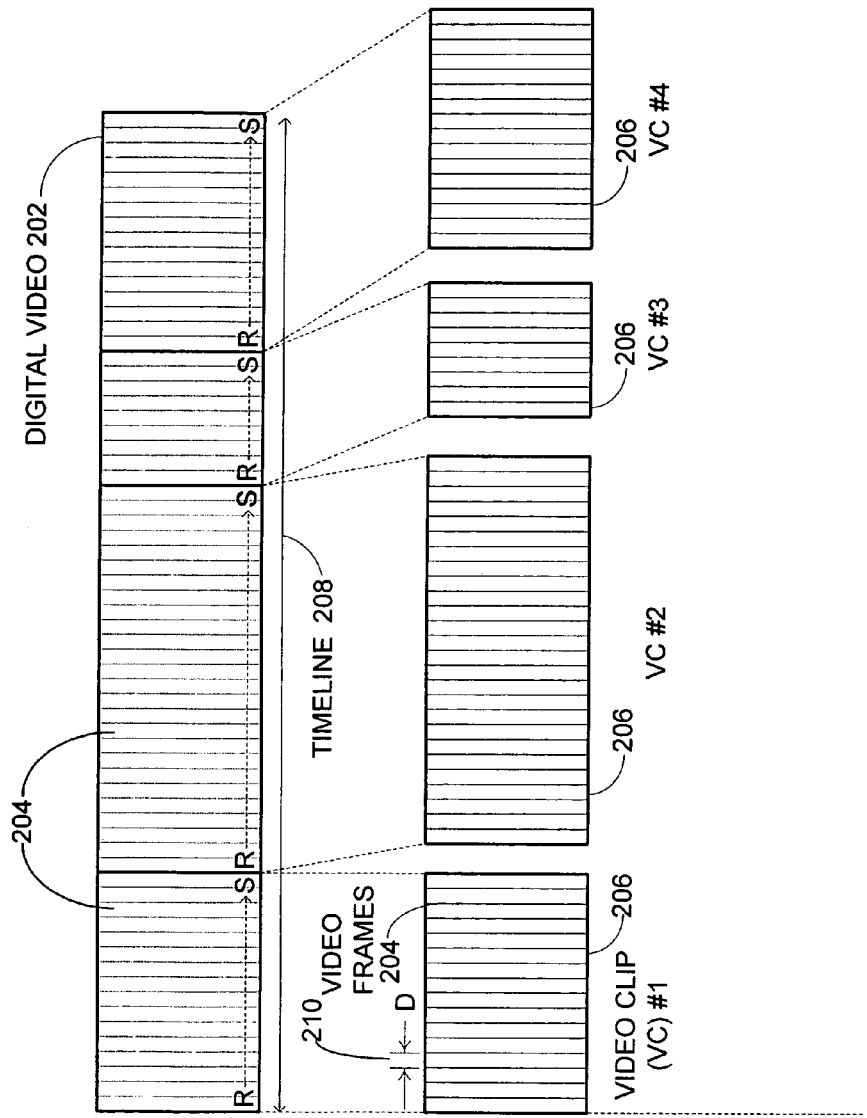
FIG. 2 is an exemplary block diagram illustrating three fundamental levels of a digital video file or a digital video.

Referring now to FIG. 2, an exemplary block diagram illustrates three levels of a digital video file 202 or a digital video. At a fundamental or base level, digital video 202 comprises multiple video frames 204, each video frame 204 typically having a fixed duration D and a known date and time at which the recording began. As known to those skilled in the art, the duration of a video frame 204 is typically a small fraction of one second (e.g., 1/30, 1/25 or 1/24) but may be any other value or may vary from frame to frame within a single video 202.

At the next higher level, digital video 202 comprises multiple video shots, or clips 206 including one or more video frames 204. As shown by timeline 208, each video clip 206 represents a continuously recorded portion of the digital video 202 between a record operation R and a stop operation S of the recording device. Within video clip 206, each subsequent video frame 204 after the first video frame 204 in the clip has a start date and time equal to the start date and time of the previous video frame 204 plus the duration D, as indicated by reference character 210, of the previous video frame 204. As known to those skilled in the art, the difference between the last frame of one clip and the first frame of the next clip is always greater than the duration of a single video frame 204. The time difference may be a few seconds or it may be several minutes, hours or even days or months away, and typically corresponds to the time between the user pressing stop on a video recording device (e.g., camcorder) and the next time the user starts recording. For still images generated, for example, by a digital still camera (DSC), the start and end times for a still image are set to the same value. In other words, a still image or photograph is treated as a video clip 206 with a duration of zero seconds.

Figure 3A:
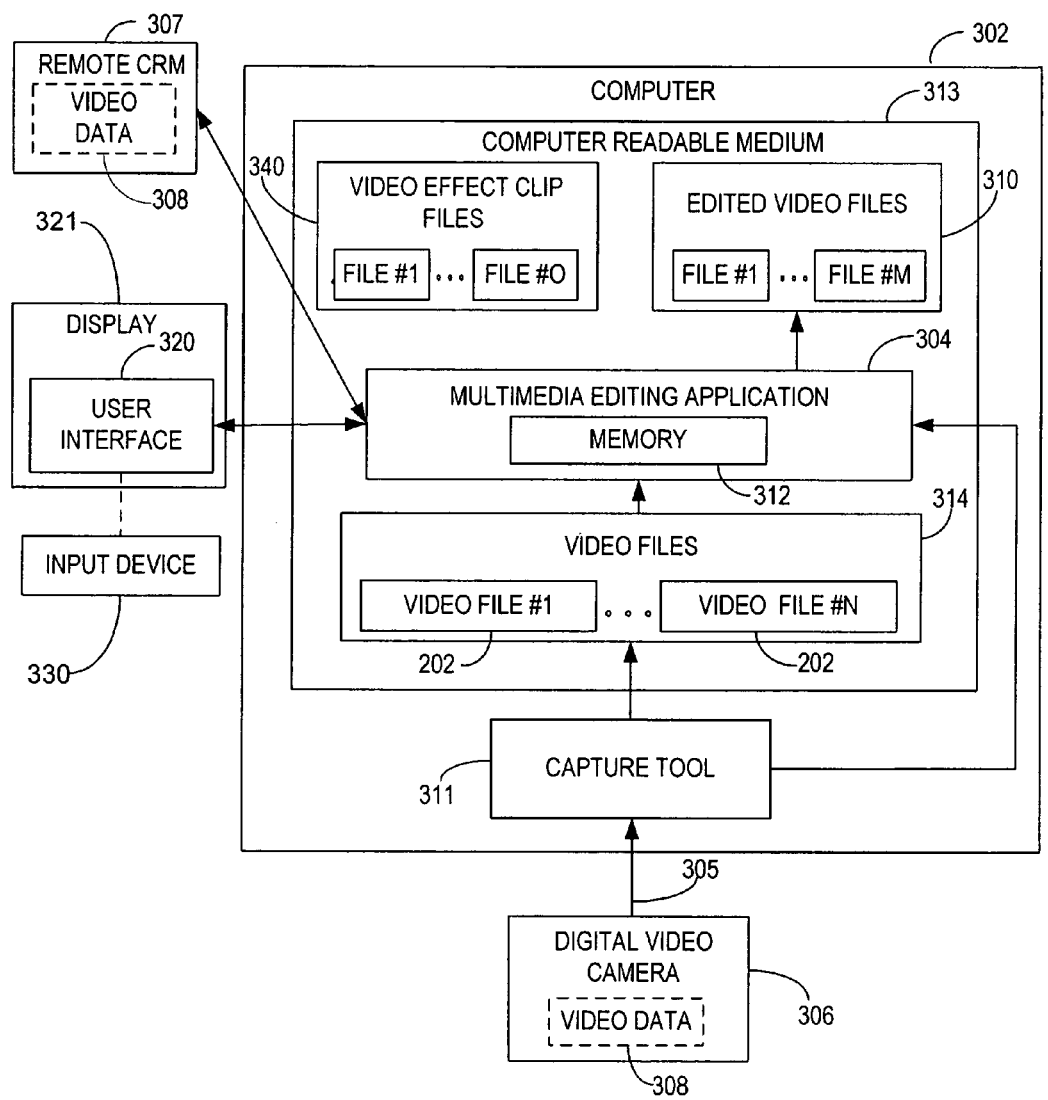
FIG. 3A is a block diagram illustrating an exemplary computer-readable medium on which aspects of the invention may be stored.

Referring now to FIG. 3A, an exemplary block diagram illustrates a suitable operating environment in which aspects of the invention may be implemented. A computer 302 comprises a multivideo editing application (MEA) 304 for performing various video editing functions including identifying video clips 206 or segment boundaries between video clips 206 within a digital video data stream (video stream) 305 captured or transferred from a video source 306. For example, a video source 306 such as a digital video camera provides, via the video data stream 305, digital video data 308 including video clips 206 and/or other video elements (e.g., still shots) to the computer 302 executing the MEA 304. Notably the video data stream 305 may transfer video data 308 from the video source 306 as the video data 308 is recorded (e.g., live feed or streaming video), or may transfer video data 308 from a video file 202 stored (e.g., previously recorded) on the video source 306. The MEA 304 organizes video frames 204 and video clips 206 and/or other video elements dynamically or statically into an edited video file 310 for the purposes of viewing the video and/or interacting with the video via a user interface 320 on a display 321, or for subsequent output onto another computer readable medium (CRM) (e.g., remote CRM 307) such as a Digital Video (DV) tape linked to the computer 302. For example, the DV tape may be an optical video disc with chapters such as a Digital Video Disk (DVD).

In one embodiment, the digital video camera 306 records a visual image or series of visual images and generates the video stream 305 representative of the visual image or series of visual images. The video stream 305 includes video data 308 specifying the start time and date of the individual video images or "video frames" included in the video stream 305.

The remote CRM 307 may be any CRM storing video data 308 that may be linked to the computer 302 for the purpose of transferring or storing video data 308. For example, the remote CRM 307 may be an optical disc in a DVD-drive, another computer, a personal video recorder (PVR), or any other video-capable device that may be linked to the computer 302 via a network (e.g. Ethernet) or direct connection (e.g. Universal Serial Bus) such that video data 308 stored on the remote CRM 307 may be transferred to the computer 302 or received from the computer 302 via electronic means such as file transfer or electronic mail.

A capture tool 311 is linked to the computer 302 and the digital video camera 306 for capturing the video stream 305. The capture tool 311 transfers the digital data directly to a memory 312 of the MEA 304 or directly to the CRM 313 (e.g., hard drive or random access memory (RAM) of the computer 302 for storage as a video file 314 containing, for example, DV data. Alternatively, the capture tool 311 may convert the format of digital video stream 305 from one digital video format to another during capture. For example, the capture tool 311 may convert the format of the video stream 305 from DV data to Windows Media Video (WMV) while preserving the date and time information about each of the series of video frame 204 included in the video data 308. The capture tool 311 may change the timing or the number of frames present within the video stream 305. For example, the capture tool 311 may convert the frame rate of the video steam 305 to a different frame rate while preserving the start time for each new video frame 204 created and calculating a new duration for each video frame 204. The capture tool 311 may be implemented using software that writes DV/Audio Video Interleave (AVI) files together with a direct connection such as an Institute of Electrical and Electronic Engineers (IEEE) 1394 interface. The IEEE-1394 interface may be connected to an IEEE-1394 connection port on a digital camcorder and connected to an IEEE-1394 connection port on the computer 302 to facilitate the transfer of the video stream 305, generated by digital video camera 306, to the computer 302 for storage. Although the capture tool 311 is described as capturing a video stream 305, it is contemplated that audio information (i.e., audio stream) that corresponds to a particular video file 202 may also be captured. Thus, as used herein, the discussion relating to video is applicable to both video and audio information.

Figure 1:
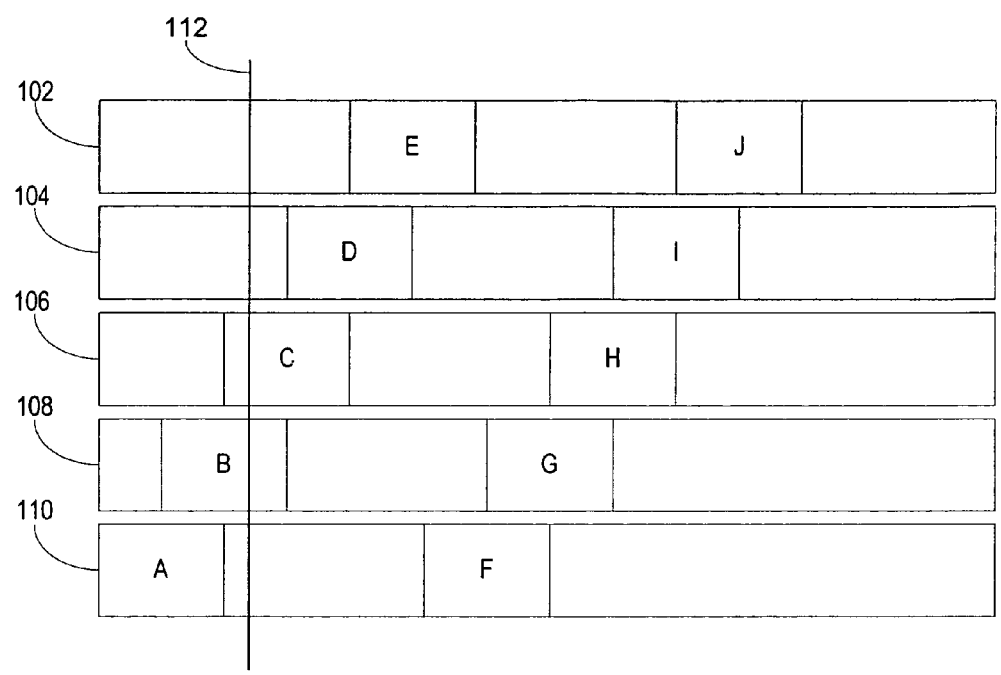
FIG. 1 illustrates video tracks used to construct video effects in a conventional video editing application.
Figure 3B:
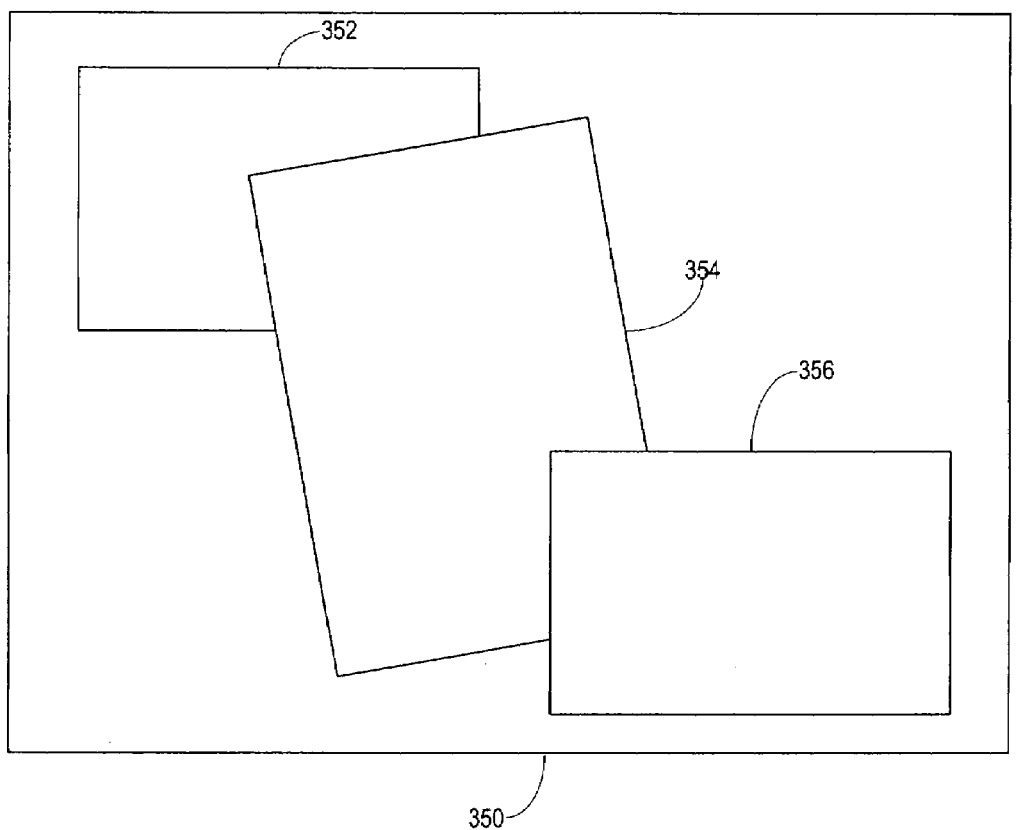
FIG. 3B is an exemplary screen shot of a photo collage effect clip.

The MEA 304 allows a user to archive captured videos and photographs in a digital format, and allows a user to add animation or special effects to selected video and/or photograph files. More specifically, the MEA 304 in the illustrated embodiment provides a graphical user interface (UI) 320 that allows the user to apply a selected video effect to selected video shots, video frames, and/or still photographs to create a video effect clip file (video effect clip) 340. For example, the user uses the UI 320 to designate a video effect such as photo collage effect to apply to selected video files 202 to create a photo collage clip 350 such as shown in FIG. 3B. In this example, the three rectangles 352, 354, and 356 could each display a different photo or video. In other words, rather than manually adding video files 202 to various video tracks as described above in reference to FIG. 1, embodiments of the MEA 304 of the invention provide a user interface that allows the user to select photos and/or videos and to designate a video effect (e.g., a collage) to apply to selected video and/or photograph files. As a result, creating such video effect clips is easier, less time consuming, and, thus more enjoyable to the user.

The exemplary operating environment illustrated in FIG. 3A includes a general purpose computing device (e.g., computing device 302) such as a computer executing computer-executable instructions. The computing device typically has at least some form of computer readable media (e.g., computer-readable medium 313). Computer readable media, which include both volatile and nonvolatile video, removable and non-removable video, may be any available medium that may be accessed by the general purpose computing device. By way of example and not limitation, computer readable medias comprise computer storage video and communication video. Computer storage video include volatile and nonvolatile, removable and non-removable video implemented in any method or technology for storage of information such as computer readable instructions, data structures, program modules or other data. Communication video typically embody computer readable instructions, data structures, program modules, or other data in a modulated data signal such as a carrier wave or other transport mechanism and include any information delivery video. Those skilled in the art are familiar with the modulated data signal, which has one or more of its characteristics set or changed in such a manner as to encode information in the signal. Wired video, such as a wired network or direct-wired connection, and wireless video, such as acoustic, RF, infrared, and other wireless video, are examples of communication video. Combinations of any of the above are also included within the scope of computer readable media. The computing device includes or has access to computer storage video in the form of removable and/or non-removable, volatile and/or nonvolatile memory. A user may enter commands and information into the computing device through an input device 330 or user interface selection devices such as a keyboard (e.g., wired or wireless) and a pointing device (e.g., a mouse, trackball, pen, or touch pad). Other input devices (not shown) may be connected to the computing device. The computing device may operate in a networked environment using logical connections to one or more remote computers.

Although described in connection with an exemplary computing system environment, aspects of the invention are operational with numerous other general purpose or special purpose computing system environments or configurations. The computing system environment is not intended to suggest any limitation as to the scope of use or functionality of aspects of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage video including memory storage devices.

Figure 4:
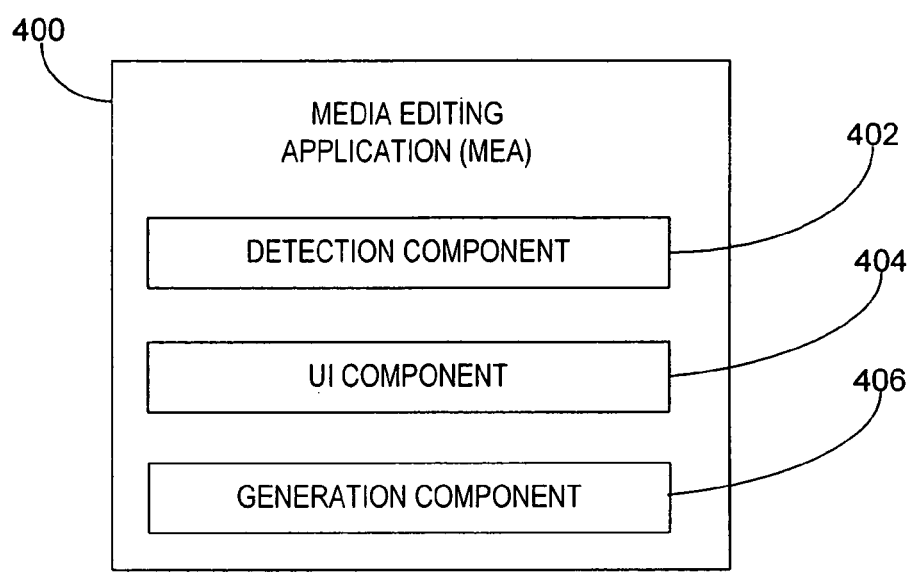
FIG. 4 is a block diagram illustrating basic components of an MEA for implementing aspects of the invention.

Referring now to FIG. 4, an exemplary block diagram illustrates basic components of a MEA 400 (e.g., MEA 304) for implementing aspects of the invention. Although it is contemplated that aspects of the invention can be used to create video effect clips 340 for at least each of the three fundamental levels of the video file 202 and or still images, as described above in reference to FIG. 2, for purposes of illustration aspects of the invention are described herein as being used to create video effect clips 340 that include one or more video files 202.

A detection component 402 searches a memory (e.g., 312) associated with the computer 302 to detect video files supported by the MEA 400. For example, the detection component 402 searches video files 202 stored in memory 312 to detect video files 202 that have a file extension that corresponds to a video file type that can be processed by the MEA 400. The detection component 402 assigns a display position to each of the detected video files 202. As explained in more detail in reference to FIGS. 6A-6C below, the assigned display position determines, in part, the position and/or the sequence a particular video file 202 will be displayed to the user during playback of the video effect clip 340. The display position may be determined based on the order in which the video file 202 is detected or based on metadata included in the video file (e.g., date, size, etc.). For example, consider the detection component 402 detects two video files 202 during the search of the memory 312. In one aspect of the invention, the detection component 402 parses metadata included in each of the two video files 202 to identify time data such as a start time of the record operation for each video file 202. Thereafter, the detection component 402 assigns a display position to each of the detected video files 202 as a function of their identified start time.

A user interface (UI) component 404 is responsive to the detection component 402 to display the detected video files 202 and a menu displaying various video effects. More specifically, the UI component 404 displays a graphical user interface to the user via a display (e.g., display 221) that allows the user to view and select compatible video files 202 and to view and select a desired a video effect from the menu to apply to the selected video files 202 to create an video effect clip 340. The user interface component 404 is responsive to user input to display and/or modify the properties of a created video effect clip 340. For example, as explained in more detail below in reference to FIG. 5B, the user can interact with the graphical user interface to view and/or modify various properties of video effect clip (e.g., number video files, display position, background type, and border color).

A generation component 406 is responsive to the user selecting one or more of the detected video files 202 and a desired video effect, being displayed by the user interface component 404, to apply the selected desired video effect to the selected video files 202 to create the video effect clip 340. The generation component 406 is further responsive to the user modifying one or more properties of the video effect clip 340 to modify the video effect accordingly. Thereafter, the UI component 404 is responsive to input from the user (e.g., user selects a play option) to play the video effect clip 340 where each of the selected video files 202 in the video effect clip 340 are displayed based on their assigned display position via the graphical user interface 320.

Referring now to FIG. 5A, a screen shot illustrates an exemplary graphical user interface 500 for allowing the user to view and select compatible video files 202 and to select a desired video effect to apply to the one or more selected video files 202. In this particular embodiment, the graphical user interface 500 provides a video effects menu 502 and a storyboard window 504 for creating the video effect clip 340. The video effects menu 502 displays various video effects that can be applied to the one or more selected video files 202 to create the video effect clip 340. A user uses the storyboard window 504 to create the video effect clip 340 by adding one or more video effects from the menu 502 to a timeline 506 within the storyboard window 504. For example, the user performs a drag and drop operation to add a particular video effect 507 from the menu 502 to the timeline 506. As known to those skilled in the art, a drag and drop operation refers to a user's ability to perform operations in a graphical user interface by dragging objects on a screen with a mouse from a first location to a second location. In this example, the user selects a photo collage effect 507 from the menu 502 to add to the timeline 506 and drags the selected photo collage effect 507 to a particular location on the timeline 506 where the user would like to incorporate the photo collage effect 507 into the video effect clip 340. Notably, more than one video effect can be added to a particular location on the timeline 506. A video effect icon 508 is responsive to user input (e.g., mouse click) to display a video effect properties menu 510 that allows the user to view and/or modify video effects applied to the video clip 340, video files included in the video effect clip 340, and other video effect clip properties.

Figure 5B:
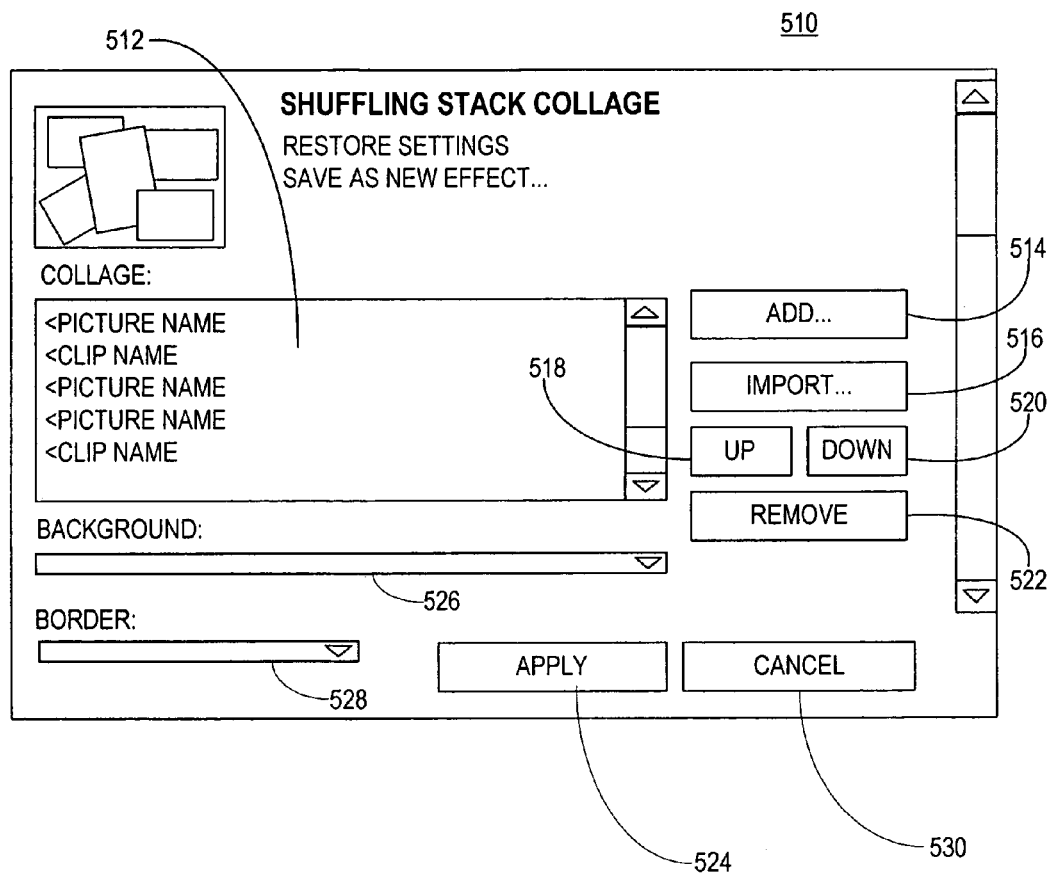
FIG. 5B illustrates an exemplary properties menu for modifying properties of a video effect clip according to one aspect of the invention.

Referring now to FIG. 5B, a block diagram illustrates components of an exemplary video effect properties menu 510 for viewing and/or modifying properties of a video effect clip 340 according to one aspect of the invention. A list box 512 displays a list of video files 202 detected by the detection component 402 (see FIG. 4). As described above in reference to FIG. 4, the detection component 402 assigns the display position to each of the detected video files 202 based on the order in which the video file 202 is detected or based on metadata included in the video file 202 (e.g., date, size, etc.). The following Table 1 illustrates a list of video files 202 selected to include in a video effect clip 340, and there assigned display positions.

TABLE 1

| DISPLAY POSITION | FILE NAME |
| --- | --- |
| 1 | VIDEO FILE B |
| 2 | VIDEO FILE C |
| 3 | VIDEO FILE D |
| 4 | VIDEO FILE A |
| 5 | VIDEO FILE E |
| 6 | VIDEO FILE F |
| 7 | VIDEO FILE G |
| 8 | VIDEO FILE H |

An add control 514 is responsive to user input to add one or more selected video files listed in the list box 512 to the video effect clip 340. For example, the user uses the input device 330 (e.g., mouse or keyboard) to select a video file 202 displayed in the list box 512, and then uses the mouse or keyboard to select the add control 514 to add the selected video file 202 to the video effect clip 340. According to one aspect of the invention, the order in which the video files 202 are added to the video effect clip 340 also determines the order each of the video files 202 will be displayed when viewing the video effect clip 340 during playback. For example, video file B corresponds to the first video file added to video effect clip 340 and is assigned position (1) in Table 1, and will be the first video file 202 displayed when viewing the video effect clip 340. Video file C corresponds to the second video file 202 added to video effect clip 340 and is assigned position two (2), and will be the second video file 202 displayed when viewing the video effect clip 340. In contrast, video file H will be the last video file 202 (e.g., assigned position 8) displayed when viewing the video effect clip 340.

An import control 516 is responsive to user input to include video files 202 in a video effect clip 340 that are not displayed in the list box 512. That is, the import control 516 allows a user to import video files 202 stored on a remote CRM 307 or removable CRM, such as a DVD, and to display the file name of the additional file in the list box 512. Thereafter, imported video files 202 can be selected as described above to include in the video effect clip 340.

Up and down position controls 518, 520 are responsive user input to change the assigned position of the files so that the order video files 202 are displayed when viewing the video effect clip 340 can be controlled. For example, the user selects a particular video file 202 from the list of video files 202 displayed in the list box 512 by positioning the mouse cursor over that particular video file 202 and right clicking the mouse. The selected video file 202 is highlighted, and the user can move the video file 202 upward in list by selecting the up position control 518 or downward in the list by selecting the down position control 520. The video effect properties menu 510 includes a remove control 522 for removing one or more video files from inclusion in the video effect clip. For example, the user uses the mouse or keyboard to select a video file displayed in the list box 502 and then uses the mouse or keyboard for selecting the remove control 522 to remove the selected video file from the video effect clip 340.

An apply control 524 is responsive to user input to apply the selected video effect to the one or more selected video files 202 to create the video effect clip 340. Thereafter, the user can select a storage control (not shown) to bum a created animated clip to a DVD, or to store the created video effect clip in a local CRM (e.g., CRM 313) or a remote CRM (e.g., 307). The properties menu 510 may also include a splitting control (not shown) that can be used to split an video effect clip into two animated clips of equal duration, and each effect would retain the full set of clips. For example, if a 30 second effect had 10 clips, splitting the clip would result in two effects 15 second effects with 10 clips each.

A background control 526 allows the user to specify a background for the video effect clip. For example, the background can be a specific color, no color (i.e., transparent or none), or a video file. A border control 528 allows the user to specify the size and color a border to apply around the video effect clip 340. A cancel control 530 is responsive to user input to remove the properties menu 510 from the display. Notably, the properties menu 510 being displayed may contain unique properties for the selected video effect clip 340. For example, a cube effect may only allow a maximum of six (6) video files to be added.

Figure 5C:
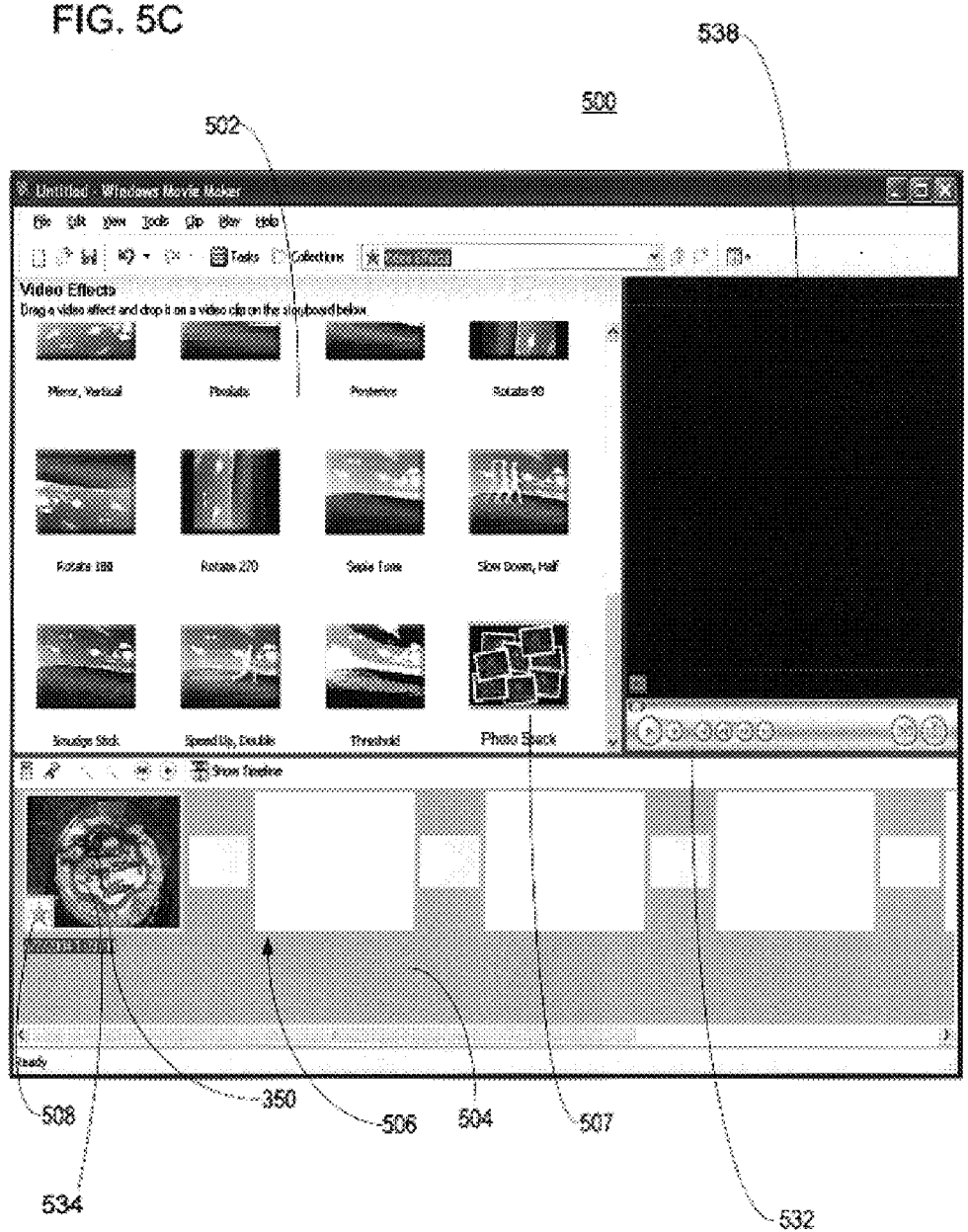

Referring now to FIG. 5C, a screen shot illustrates the exemplary graphical user interface 500 being used to add a video effect to an existing video clip or photo on a timeline 506, rather than adding the video effect directly to the storyboard 504 as described above in reference to FIG. 5A. In this case, the existing video file 202 on the storyboard 504 will be displayed as the background of the video effect clip 340. For example, if the user selects the photo collage effect 507 from the video effects menu 502, and adds the photo collage effect to an existing video file 202 showing a birthday cake, as indicated by 534, the video of the birthday cake appears in the background of the photos an/or videos added to the photo collage effect 507. As described above, clicking the effects icon 703 allows the user to view the various video effects applied to the video effect clip 340 and the properties menu 510.

Referring now to FIGS. 5A and 5C, the exemplary graphical user interface 500 further includes a playback window 538 for playing the video effect clip 340. A playback control 532 controls the playback of the video effect clip 340. More specifically, the playback control 532 allows a user to stop, play/pause, rewind, or fast forward a video effect clip 510 in the playback window 530. By default, the duration of the playback the video effect clip 340 is based on the duration of the content (e.g., video files, photo) within the video effect clip 340. Notably, some video effect clips 340 may have a custom duration property that can be adjusted by the user via the properties menu, and, thus, allowing the user to specify a specific duration value. In the absence of such a property, or the user adjusting such a property, the duration of the video effect clip 340 will be intelligently and automatically adjusted based on the type of video effects added and the number of elements (e.g., photos and video files) added to the video effect clip 340. For example, if the user adds a photo stack video effect (see FIG. 3B) and adds three photos to the video effect, by default the duration the video effect will total fifteen (15) seconds, five (5) seconds per photo added to the effect. If the user were to modify the properties of video effect clip 340 by, for example, adding three (3) additional photos, the duration of the video effect clip 340 would then be thirty (30) seconds. As a result, the user is not required to modify elements on the storyboard or timeline when adding or removing elements to the video effect clip 340. For example, without this support, if the video effect clip 340 includes six photos, each having a playback duration of five (5) seconds, and three of the photos are removed, the remaining three photos would still playback over a duration of thirty (30) seconds. As a result, each photo is shown for longer period of time, which could adversely impact how the user visualizes the video effect clip 340. However, the present invention allows the user to automatically adjust the duration without impacting the speed of the video effect clip 340. If a video effect is added to a video file 202 as described above in reference to FIG. 5C, the duration of the video effect clip 340 will be based on the duration of the video to which it is added. However, the video effect clip 340 will continue to be intelligent and ensure that the video is displayed correctly. For example, if the background video is only 30 seconds long, and the user adds 10 photos, the photos will be arranged so they will be displayed for 5 seconds each. Notably, it is contemplated that video effect clips 340 can be configured to allow the user to determine the duration of the effect or the speed of the effect.

Figure 6A:
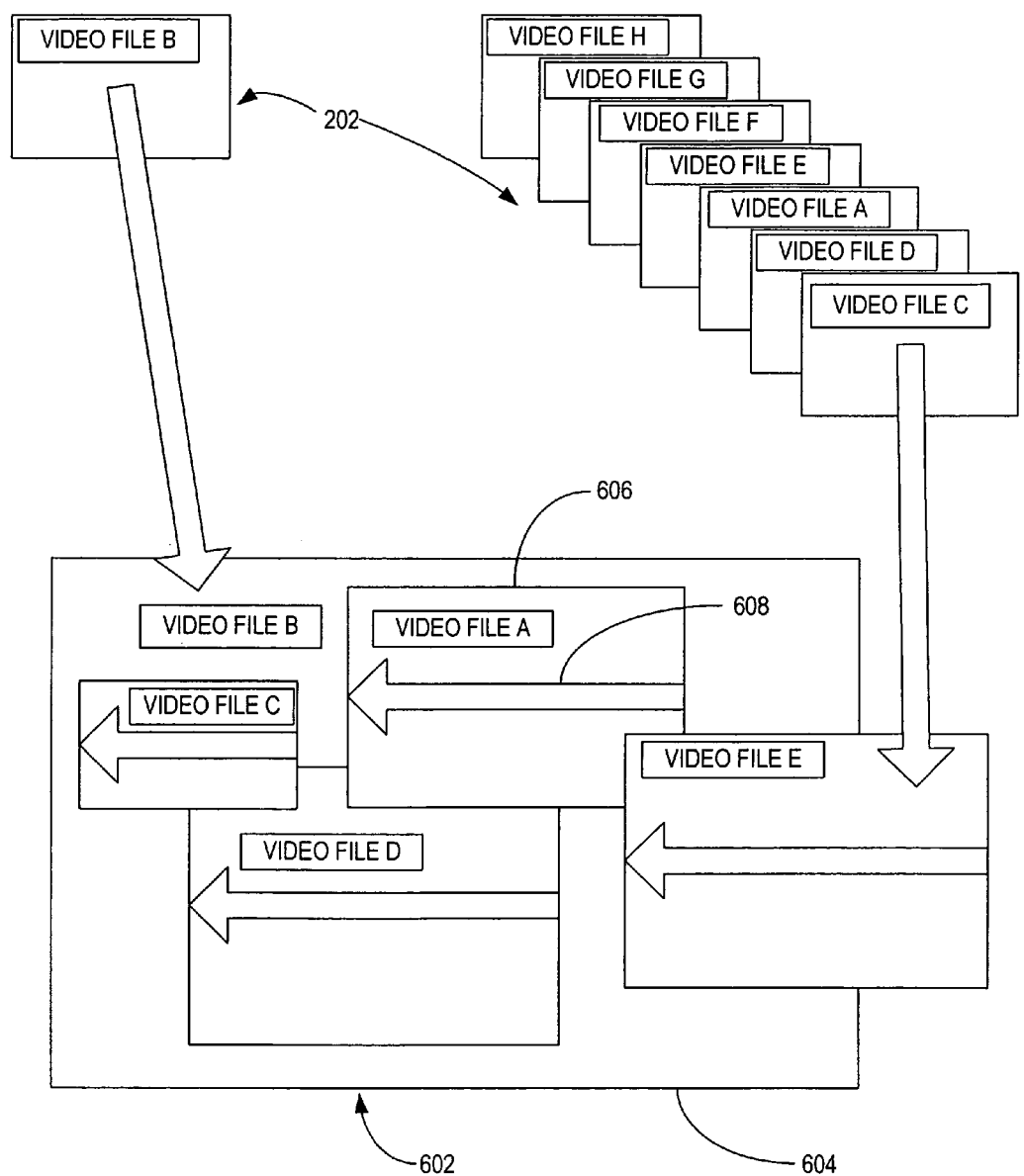
Figure 6C:
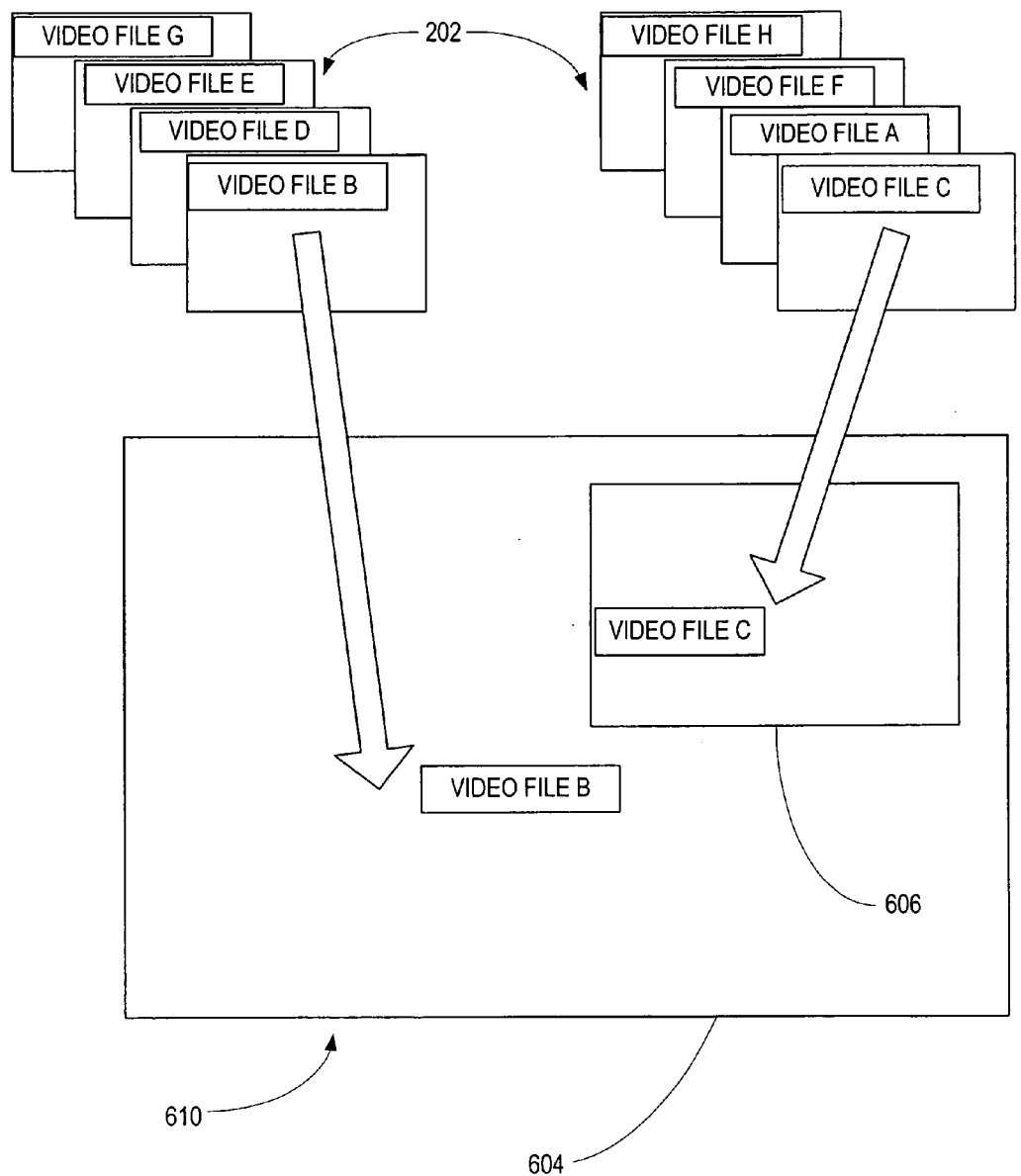

FIGS. 6A, 6B, and 6C illustrate various video effect that can be applied to the selected video files 202 shown in Table 1 to create a video effect clip 340. FIG. 6A illustrates a moving collage effect 602. As shown in FIG. 6A, video file B, which is assigned position 1, is displayed in a larger animation window 604, and the remaining video files C, D, A, E, F, G, and H are displayed via a plurality of smaller animation windows 606 that each move from right to left, as indicated by arrow 608, across the larger animation window 604 according to their assigned position. FIG. 6B illustrates a rotating cube effect 607. In this example, the video file B is displayed in the larger animation window 604, and the remaining video files are displayed via a three dimensional rotating cube 609 within the larger animation window 604. FIG. 6C illustrates a picture in picture effect 610. In this case, only two video files 202 are displayed on the screen at the same time. For example, the video file B is displayed in the larger window 604, and video file C (assigned position 2) is displayed in the smaller animation window 606 within the larger animation window 604. Similarly, video file D (assigned position 3) will be displayed in the larger window 604, and the video file A (assigned position 4) will be displayed in the smaller window 606 within the larger window 604. This process continues until all the video files have been displayed.

Referring now to FIG. 7, an exemplary flow chart illustrates a method for creating a video effect clip 340 according to one aspect of the invention. The MEA displays a video effects menu 502 that includes various video effects and displays a storyboard window at 702. At 704, the MEA creates a video effect clip in response to the user adding a video effect from the menu 502 to the storyboard window 504. For example, as described above in reference to FIG. 4, the user can add the video effect to the storyboard window 504 by dragging and dropping the video effect on a timeline 506 in the storyboard window 504. After one or more the video effects have been added to the storyboard window 504, the MEA is responsive to user input to display a properties menu 510 that displays properties associated with each video effect clip 340 at 706. For example, the MEA is responsive to the user clicking on the video effects icon 508 associated with a particular video effect clip 340 to display a properties menu 510 that allows the user selectively modify properties of that particular video effect clip 340. The user selectively modifies properties of the video effect clip at 708. For example, the user uses the properties menu 510 to add video files 202 to the video effect clip 340, remove video files 202 from the video effect clip 340, re-assign display positions of video files included in the video effect clip, select the background of the video effect clip 340, and select the border color of the video effect clip 340. The MEA is responsive to the user modifications, to apply any property changes (e.g., add photos or video files, background, border) to the video effect clip at 710. At 712, the MEA plays the video effect clip 340 in the preview window 538 in response to input from the user.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. One or more computer-readable storage media having computer executable components executed by a computing device, said computer executable components comprising:

a detection component detecting video files stored in a memory;

a user interface (UI) component displaying a plurality of user selectable video effects and the video files that are detected by the detection component, said plurality of user selectable video effects including a first video effect that defines first display positions for simultaneously displaying a first set of three or more of the video files and a second video effect that defines second display positions for simultaneously displaying a second set of three or more of the video files, wherein said first display positions and said second display positions are different; and a generation component creating a video effect clip, wherein said creating includes applying the first video effect to a first set of three or more of the video files, in response to a user selecting said first video effect and said three or more of the video files of the first set, to create a first incorporated video effect that simultaneously displays the three or more of the video files of the first set according to the defined first display positions, and wherein said creating includes applying the second video effect to a second set of three or more of the video files, in response to a user selecting said second video effect and said three or more of the video files of the second set, to create a second incorporated video effect that displays the three or more of the video files of the second set according to the defined second display positions, wherein the UI component displays the video files detected by the detection component via a properties menu and displays the plurality of user selectable video effects via a video effects menu, wherein the generation component is responsive to user input selecting the first video effect from the video effects menu, adding the first video effect to a storyboard window, and selecting the three or more of the video files of the first set from the properties menu to apply the first video effect to the selected three or more of the video files of the first set to create the first incorporated video effect, and wherein the UI component displays the created video effect clip having the first incorporated video effect and the second incorporated video effect via a graphical display.

2. The one or more computer-readable storage media of claim 1, wherein the UI component displays a video effect icon corresponding to the first incorporated video effect, and wherein said video effect icon is responsive to user input to display the first incorporated effect applied to the three or more of the video files of the first set and to display the properties menu.

3. The one or more computer-readable storage media of claim 1, wherein UI component further displays: a background control responsive to user input specifying a desired background to apply the desired background to the first incorporated video effect, wherein said specifying a desired background includes specifying a color, no color, or a video file to display in a background of the first incorporated video effect; and a border control responsive to user input specifying a desired border to apply the desired border to the first incorporated video effect, wherein said specifying a desired border includes specifying a desired border color, a desired border size, or both to apply to the first incorporated video effect.

4. The one or more computer-readable storage media of claim 1, wherein the UI component displays an add control responsive to user input to add each of the selected three or more of the video files of the first set to the first incorporated video effect, and wherein the detection component assigns one of the defined first display positions to each of the selected three or more of the video files of the first set based on an order that each of the selected three or more video files of the first set is added to the first incorporated video effect.

5. The one or more computer-readable storage media of claim 4, wherein the UI component displays an import control responsive to user input to add an additional video file from a remote memory to a list of video files detected by the detection component, wherein the UI component displays the add control responsive to user input to select the additional video file to add the selected additional video file to the first incorporated video effect, and wherein the UI component assigns one of the defined first display positions to the additional video file based on an order in which the additional video file is added to the first incorporated video effect.

6. The one or more computer-readable storage media of claim 4, wherein the UI component displays a position control responsive to user input for re-assigning the assigned first display positions of the selected three or more of the video files of the first set, and wherein the UI component displays each of the selected three or more selected of the video files of the first set in the first incorporated video effect according to the re-assigned display position of said each of the selected three or more of the video files of the first set.

7. A computerized method for displaying a plurality of video files, said computerized method comprising:
    detecting video files stored in a memory;
    displaying a plurality of video effects and the detected video files via a graphical display;
    selecting, in response to user input, a video effect from the plurality of video effects in a video effects menu, said selected video effect defining display properties for simultaneously displaying three or more video files and moving the three or more video files while said three or more video files are being simultaneously displayed, wherein said selecting includes adding the video effect from the video effects menu to a storyboard window;
    receiving, in response to user input, three or more video files selected by the user from the detected video files via a properties menu;
    applying the display properties defined by the selected video effect to the selected three or more video files for creating a video effect clip; and
    displaying the video effect clip via the graphical display, wherein said displaying includes simultaneously displaying the selected three or more video files and moving the selected three or more video files while the selected three or more video files are being simultaneously displayed.

8. The computerized method of claim 7 further including assigning an initial display position to each of the selected three or more video files for simultaneously displaying the selected three or more video files, wherein said displaying the video effect clip includes displaying each of the selected three or more video files in the video effect clip according to the assigned initial display position of each of the selected three or more video files.

9. The computerized method of claim 8, wherein the initial display position is assigned based on metadata included in each of the selected three or more video files, or based on an order in which each of the selected three or more video files is detected.

10. The computerized method of claim 8 further including selectively re-assigning display positions for each of the selected three or more video files in response to user input, wherein said displaying the video effect clip includes displaying each of the selected three or more video files in the video effect clip according to the re-assigned display position of each of the selected three or more video files.

11. The computerized method of claim 8 further including generating a list of detected video files, wherein each of the detected video files in the generated list are organized according to an initial display position assigned to said each of the detected video files, and wherein said displaying the detected video files includes displaying the generated list of detected video files via the graphical display.

12. The computerized method of claim 11 further including selectively importing additional video files from a remote memory to add to the generated list of detected video files, wherein each of the additional video files are assigned a display position, and wherein each of the additional video files in the generated list are organized according to the assigned display position of each of the additional video files.

13. The computerized method of claim 7 further including: displaying a background control responsive to user input specifying a desired background to apply the desired background to the video effect clip, wherein said specifying a desired background includes specifying a color, no color, or a video file to display in a background of the video effect clip; and displaying a border control responsive to user input specifying a desired border to apply the desired border to the video effect clip, wherein said specifying a desired border includes specifying a desired border color, a desired border size, or both to apply to the video effect clip.

14. A system for creating a video clip, said video clip displaying a plurality of animated video files, said system comprising:
a processor executing instructions stored on one or more computer-readable storage media to perform the following operations:
detecting video files stored in a memory;
displaying a list of the detected video files via a graphical display;
displaying a plurality of video effects via the graphical display;
selecting, in response to user input, a video effect from the plurality of video effects in a video effects menu, said selected video effect defining display properties for animating three or more video files, wherein said selecting includes adding the video effect from the video effects menu to a storyboard window;
receiving, in response to input by a user, three or more video files selected by the user from the detected video files via a properties menu;
applying the display properties defined by the selected video effect to the selected three or more video files to create a video effect clip that simultaneously displays the selected three or more video files and moves the selected three or more video files while said selected three or more video files are being simultaneously displayed; and
an interface displaying the video effect clip created by the processor.

15. The system of claim 14, wherein the operations further comprise assigning a display position to each of the selected three or more video files, wherein the interface displays each of the selected three or more video files in the video effect clip as a function of the assigned display position of each of the selected three or more video files.

16. The system of claim 15, wherein the operations further comprise: importing additional video files from a remote memory to add to the list of the detected video files; and assigning a display position to each of the additional video files based on an order in which the additional video file is added to the list of the detected video files.

* * * * *

UNITED STATES PATENT AND TRADEMARK OFFICE
CERTIFICATE OF CORRECTION

PATENT NO. : 7,644,364 B2  Page 1 of 1
APPLICATION NO. : 11/250738
DATED : January 5, 2010
INVENTOR(S) : Patten et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 526 days.

Signed and Sealed this

Sixteenth Day of November, 2010

David J. Kappos
*Director of the United States Patent and Trademark Office*